June 27, 1967  H. W. LEE, JR., ET AL  3,327,596
METHOD AND APPARATUS FOR ROTATING AND AXIALLY
ADVANCING TUBULAR STOCK OR THE LIKE
Filed May 14, 1964  8 Sheets-Sheet 1
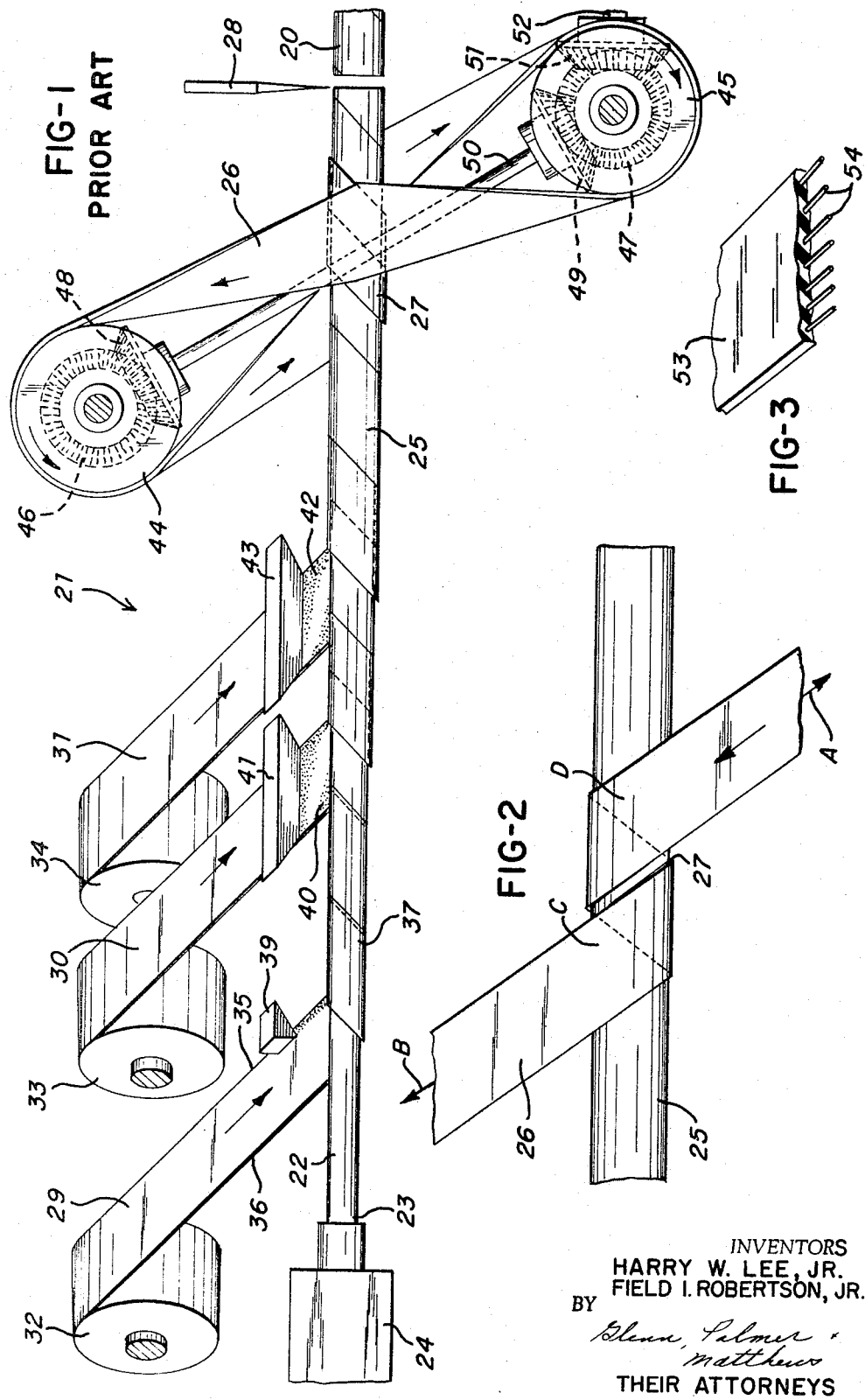
INVENTORS
HARRY W. LEE, JR.
FIELD I. ROBERTSON, JR.
BY
Glenn, Palmer &
Matthews
THEIR ATTORNEYS June 27, 1967 H. W. LEE, JR., ET AL 3,327,596
METHOD AND APPARATUS FOR ROTATING AND AXIALLY
ADVANCING TUBULAR STOCK OR THE LIKE
Filed May 14, 1964 8 Sheets-Sheet 2
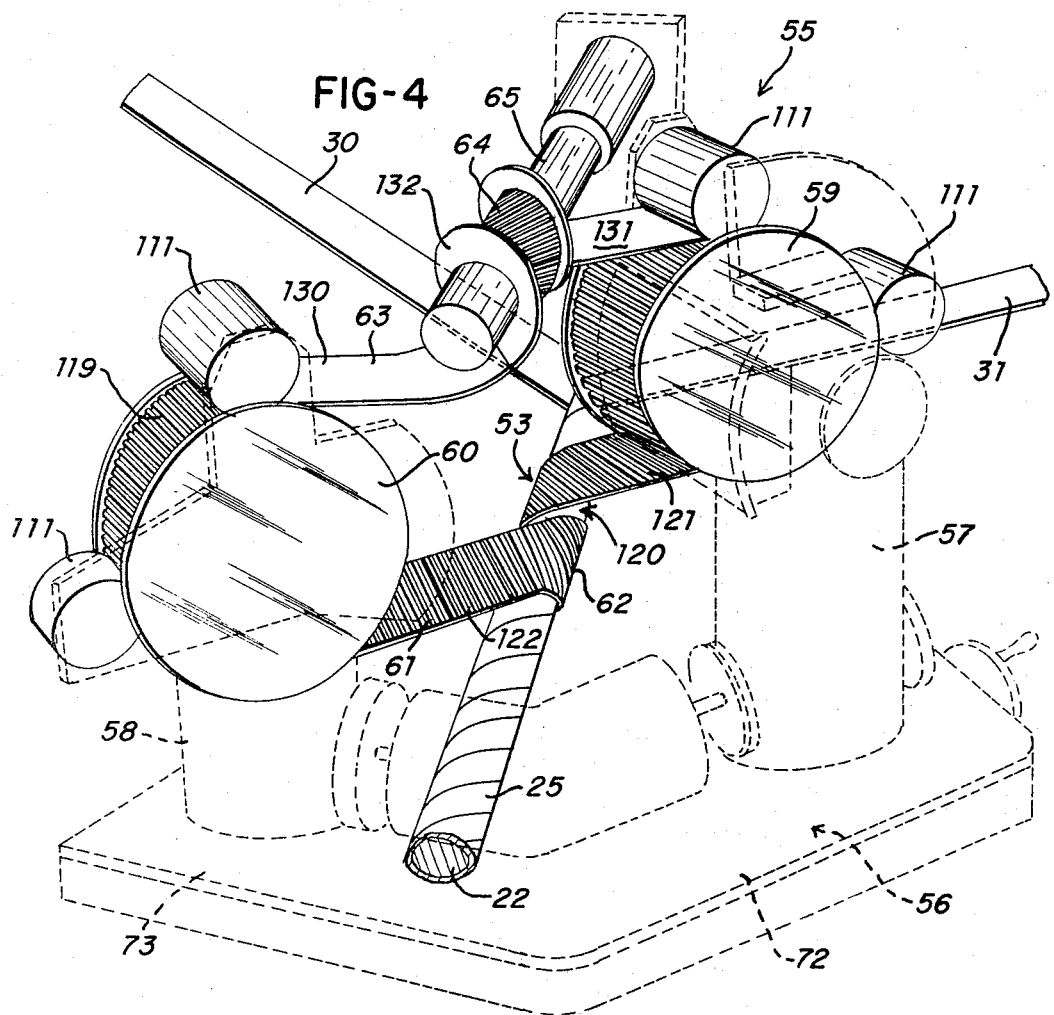
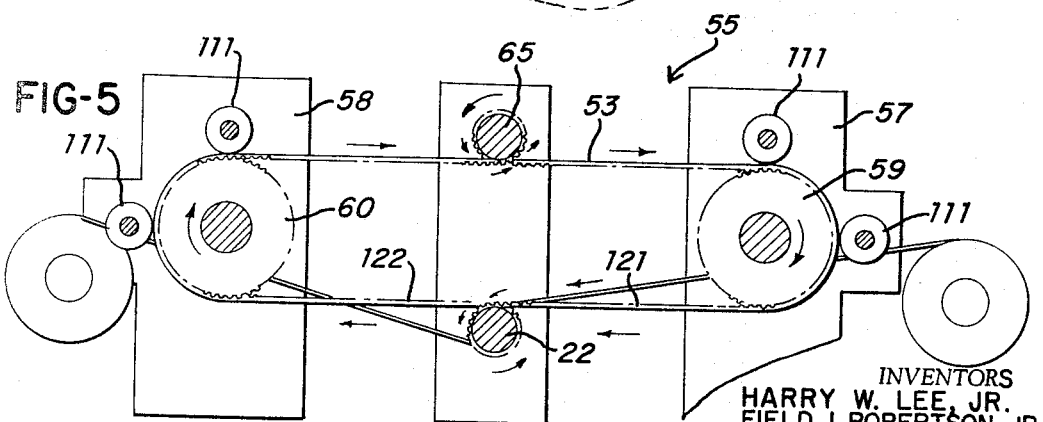
INVENTORS
HARRY W. LEE, JR.
FIELD I. ROBERTSON, JR.
BY
THEIR ATTORNEYS

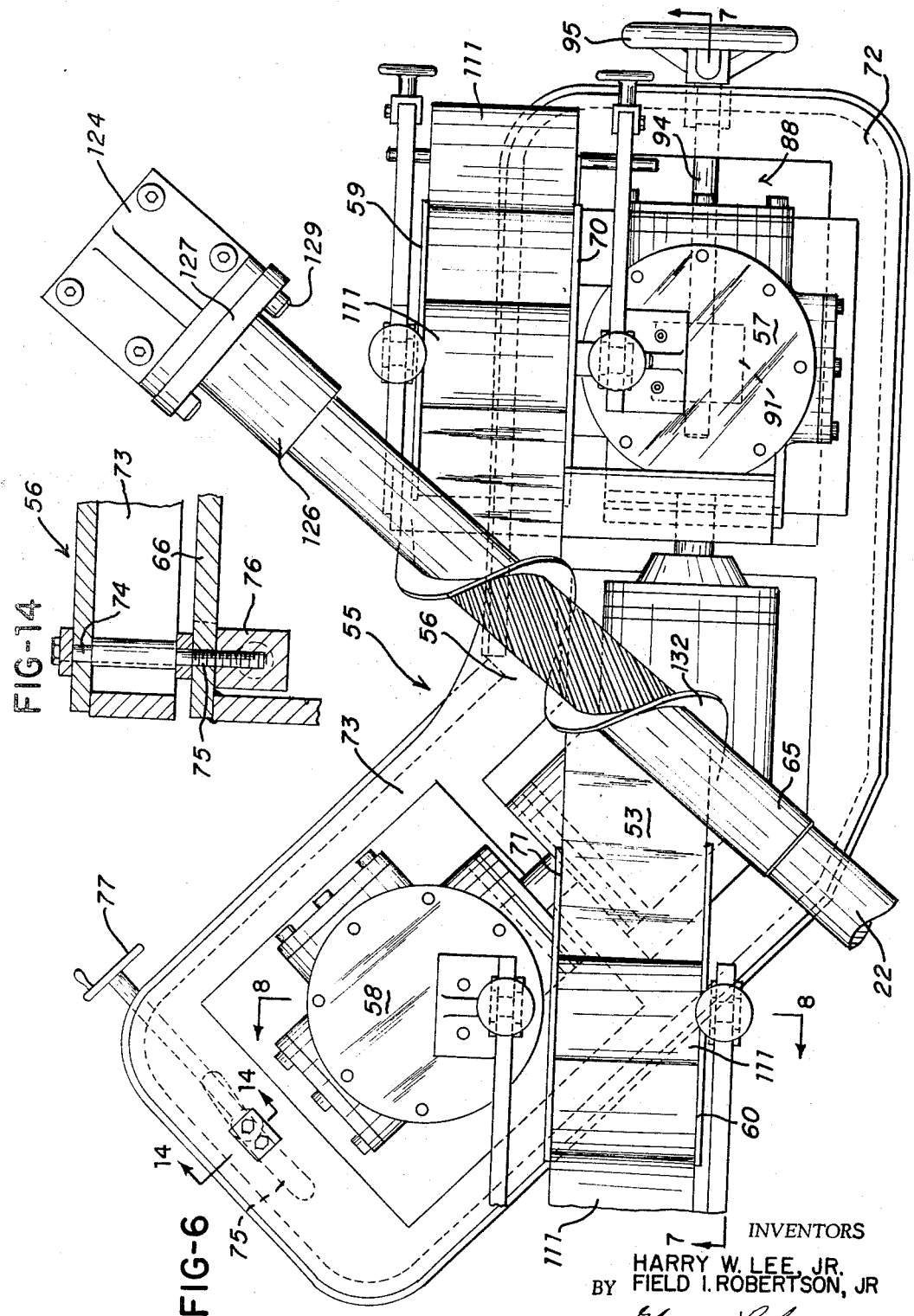

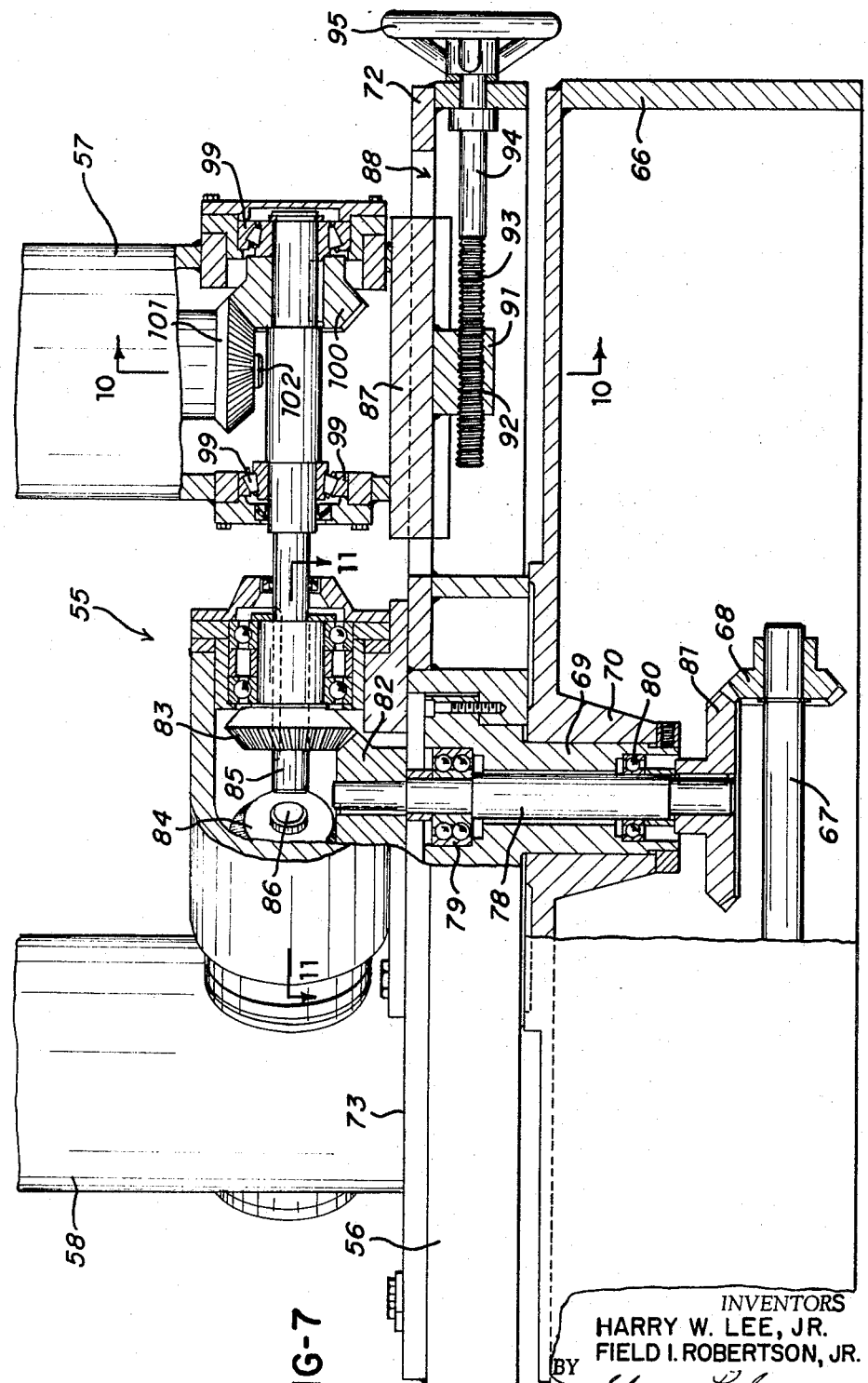

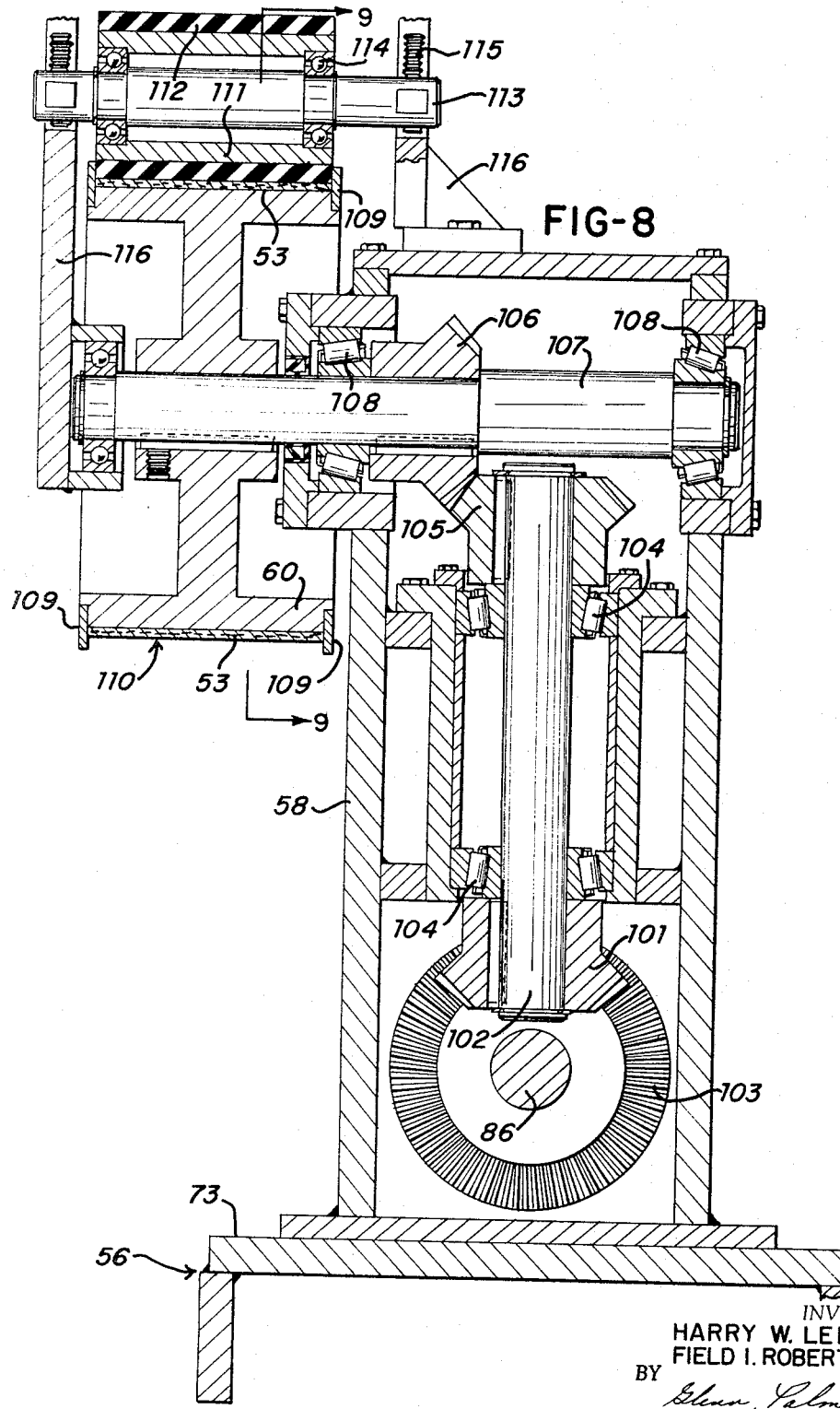

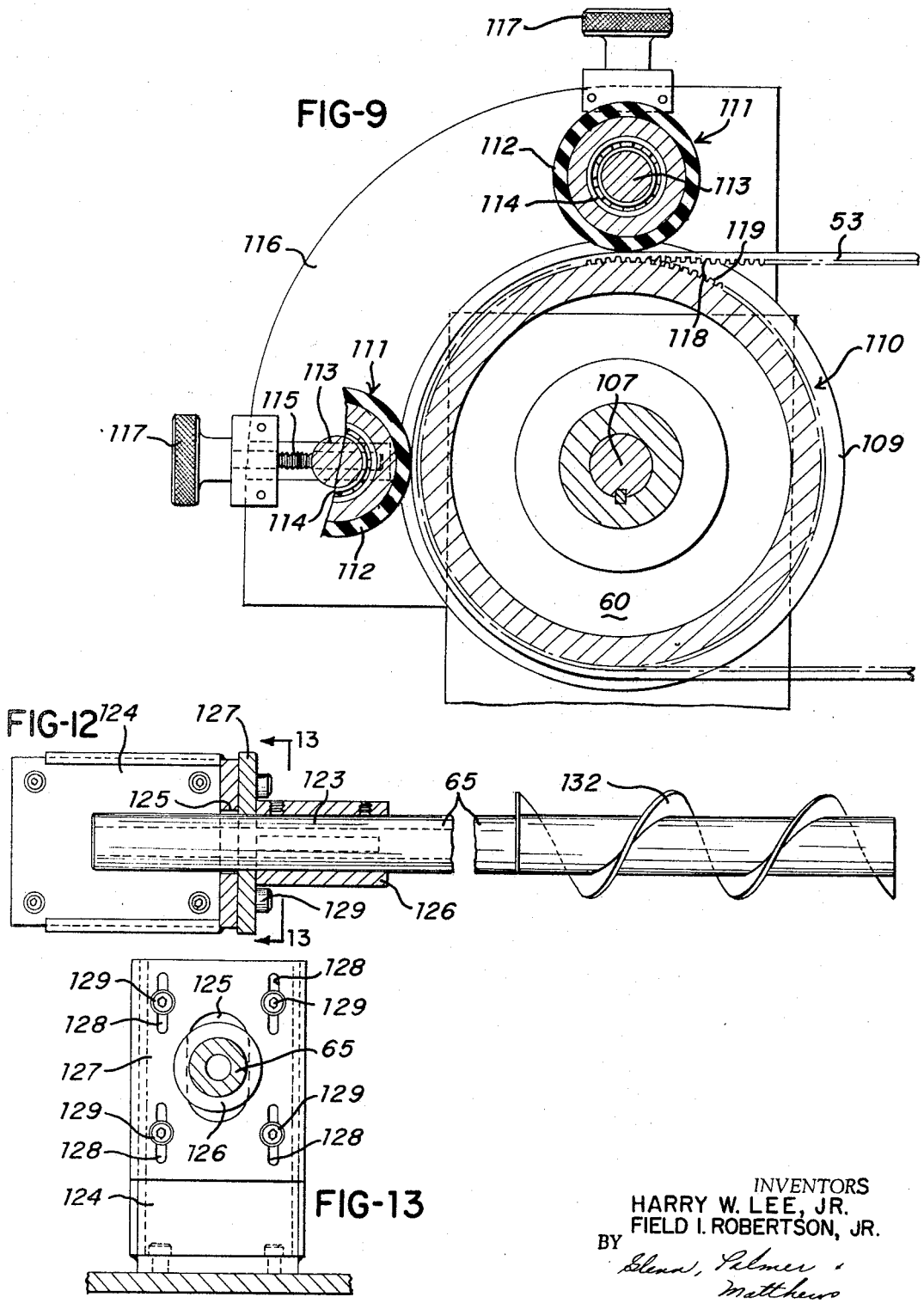

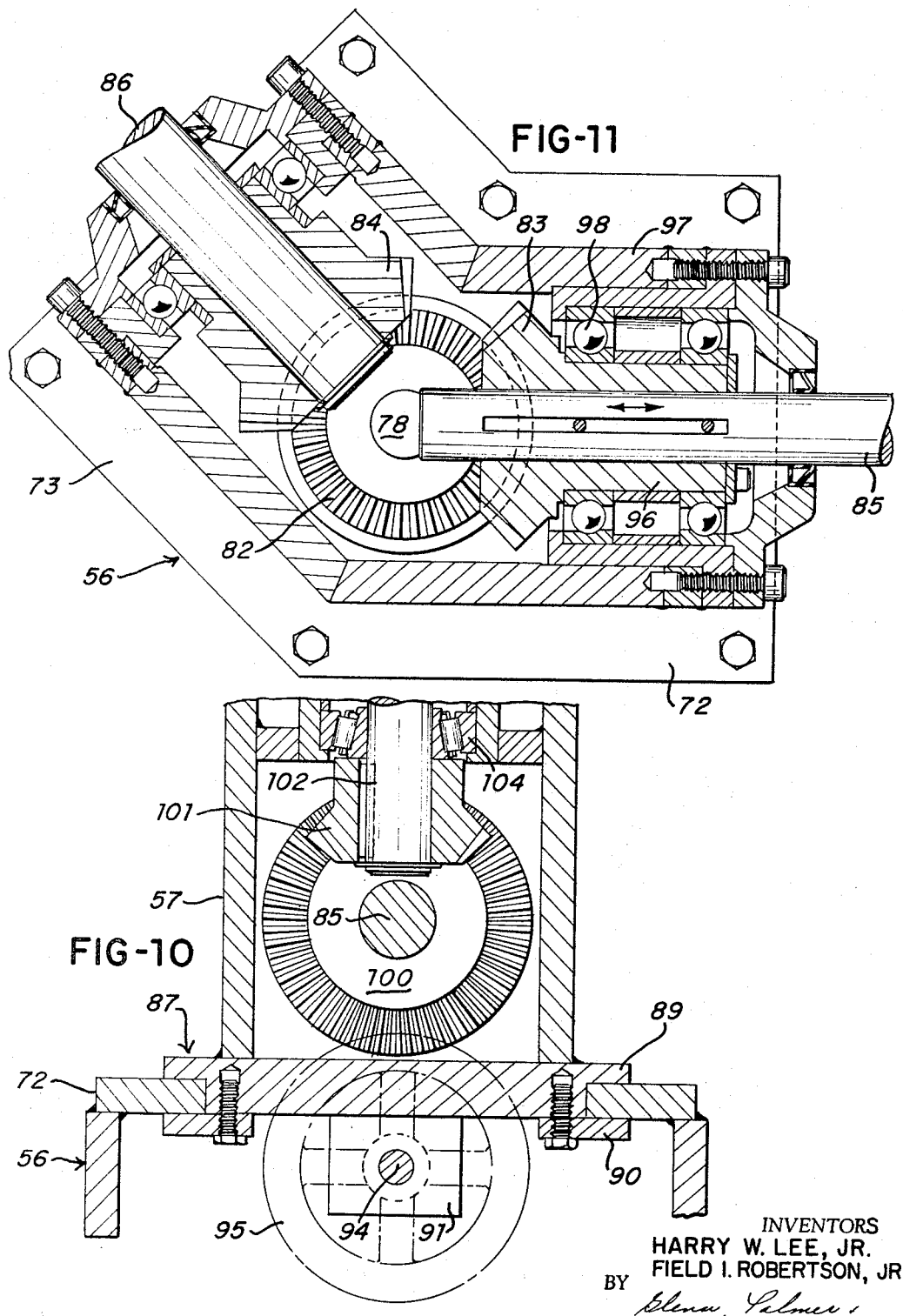

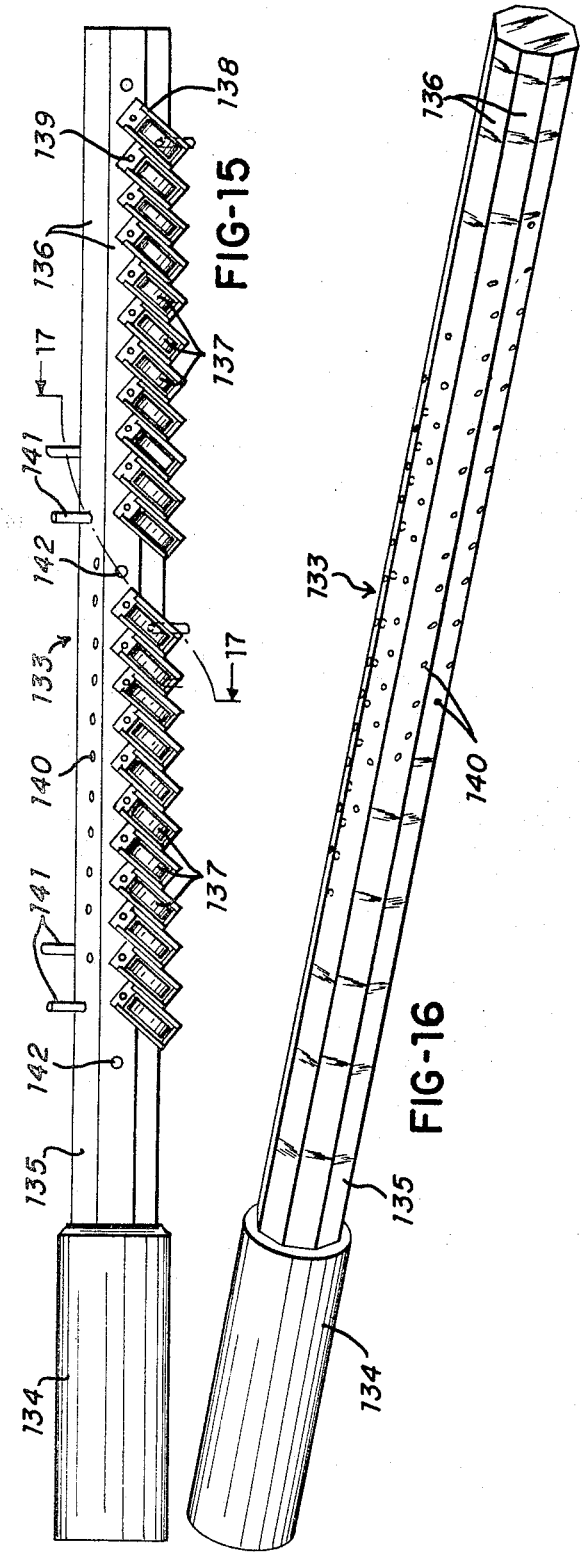
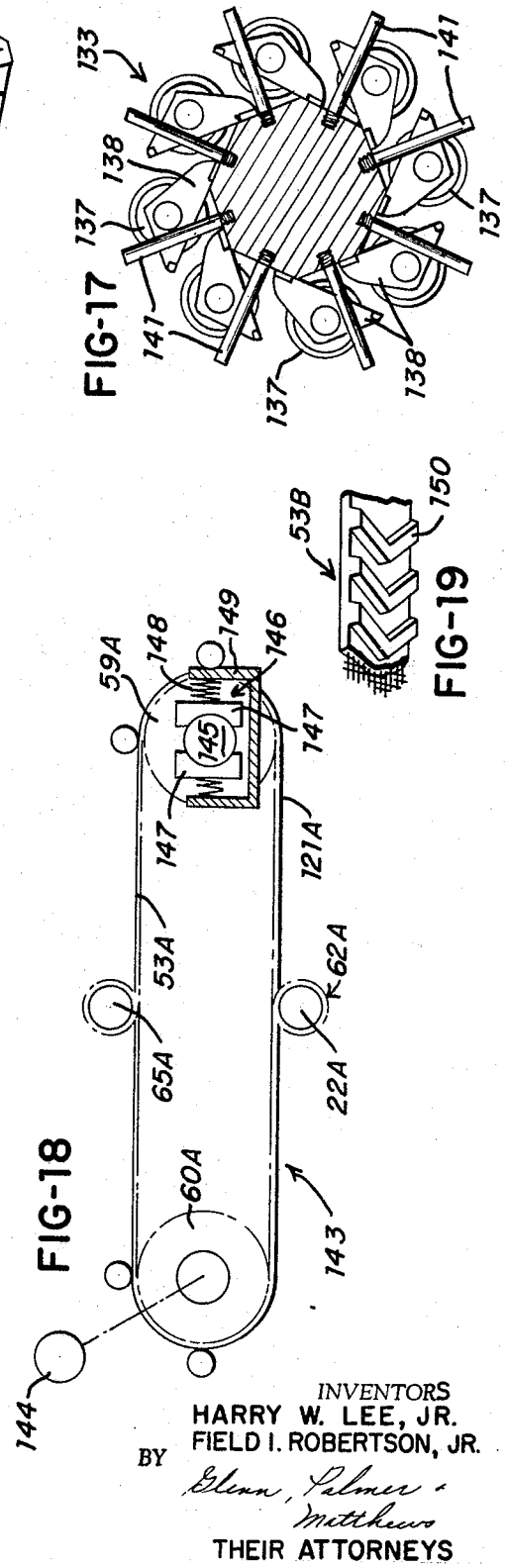
INVENTORS
HARRY W. LEE, JR.
FIELD I. ROBERTSON, JR.
BY Glenn, Palmer & Matthews
THEIR ATTORNEYS United States Patent Office 3,327,596
Patented June 27, 1967

3,327,596
METHOD AND APPARATUS FOR ROTATING AND AXIALLY ADVANCING TUBULAR STOCK OR THE LIKE
Harry W. Lee, Jr., and Field I. Robertson, Jr., both of Chesterfield County, Va., assignors to Reynolds Metals Company, Richmond, Va., a corporation of Delaware
Filed May 14, 1964, Ser. No. 367,506
44 Claims. (Cl. 93—80)

This invention relates to an improved method and apparatus for continuously rotating and axially advancing tubular stock or the like.

In particular, it is well known that composite containers or other tubular members are continuously formed by continuously drawing one or more strips of container material onto a cylindrical mandrel to continuously produce helically wound container body stock or the like.

In order to continuously produce such container body stock, some means must be provided for continuously rotating and axially advancing such container body stock on the cylindrical mandrel so that the strips of material will be continuously drawn and helically wound thereon whereby the continuously rotating and axially advancing container stock can be serially cut into individual container bodies as the stock advances beyond the free end of the cylindrical mandrel.

In the past, the means for continuously rotating and axially advancing the container body stock has comprised a continuous belt looped around a pair of pulleys in a crossed manner so that one of the crossed runs of the continuous belt can be looped about the container body stock to cause the container body stock to continuously rotate and axially advance on the mandrel as the crossed belt continues to move in one direction.

However, it has been found that such prior known crossed belt has a relatively short life not only because the crossed runs thereof rub against each other to wear out the belt, but also because the crossed belt must be twisted to perform its functions, undue stretching occurs at the edges of the belt to increase the time of failure thereof and prevent the same from having non-stretchable reinforcing means therein to increase the life of the belt.

In addition, such prior known crossed belt has undue side weave and stretches as it goes around the container body stock to produce an adverse skewing of the helically wound strips of container material as well as a wrinkling of the inner and outer strip of lining and labeling material of the container body stock.

However, according to the teachings of this invention, an improved means is provided for continuously rotating and axially advancing container body stock on a mandrel or the like whereby not only are the above disadvantages of the prior known crossed belt eliminated, but also the belt means of the apparatus and methods of this invention more accurately controls the formation of the container body stock and has a life appreciably longer than the prior known crossed belt.

Accordingly, it is an object of this invention to provide improved methods for rotating and axially advancing tubular stock or the like, the method of this invention having one or more of the novel features set forth above or hereinafter shown or described.

Another object of this invention is to provide an improved apparatus for rotating and axially advancing tubular members or the like, the apparatus of this invention having one or more of the novel features set forth above or hereinafter shown or described.

Other objects, uses and advantages of this invention are apparent from a reading of this description which proceeds with reference to the accompanying drawings forming a part thereof and wherein:

FIGURE 1 is a schematic perspective view illustrating the prior known crossed belt means for rotating and axially advancing container body stock on a mandrel or the like.

FIGURE 2 is a schematic perspective view illustrating the action that takes place on a belt being looped around container body stock or the like.

FIGURE 3 is a fragmentary broken away perspective view illustrating one embodiment of the improved belt to this invention.

FIGURE 4 is a schematic perspective view illustrating one embodiment of the apparatus of this invention.

FIGURE 5 is a schematic end view of the apparatus illustrated in FIGURE 4.

FIGURE 6 is a top view of the improved apparatus of this invention illustrated in FIGURE 4.

FIGURE 7 is a cross-sectional view taken on line 7—7 of FIGURE 6.

FIGURE 8 is an enlarged cross-sectional view taken on line 8—8 of FIGURE 6.

FIGURE 9 is a cross-sectional view taken on line 9—9 of FIGURE 8.

FIGURE 10 is an enlarged, fragmentary, cross-sectional view taken on line 10—10 of FIGURE 7.

FIGURE 11 is an enlarged, fragmentary, cross-sectional view taken on line 11—11 of FIGURE 7.

FIGURE 12 is a top view of the belt return mandrel of the apparatus of this invention.

FIGURE 13 is a cross-sectional view taken on line 13—13 of FIGURE 12.

FIGURE 14 is an enlarged, fragmentary, cross-sectional view taken on line 14—14 of FIGURE 6.

FIGURE 15 is a side view of another embodiment of the return mandrel of this invention.

FIGURE 16 is a perspective view of the return mandrel of FIGURE 15 with the rollers thereof removed.

FIGURE 17 is a cross-sectional view taken on line 17—17 of FIGURE 15.

FIGURE 18 is a view similar to FIGURE 5 and illustrates another embodiment of the apparatus of this invention.

FIGURE 19 is a fragmentary, perspective view illustrating another embodiment of the belt means of this invention.

While the various features of this invention are hereinafter described and illustrated as being particularly adaptable for continuously forming container body stock, it is to be understood that the various features of this invention can be utilized singly or in any combination thereof to provide means for producing or moving other articles as desired.

Therefore, this invention is not to be limited to only the embodiments illustrated in the drawings, because the drawings are merely utilized to illustrate one of the wide variety of uses of this invention.

Referring now to FIGURE 1, the prior art method and apparatus for continuously forming individual container bodies 20 is generally indicated by the reference numeral 21 and comprises a stationary and cylindrical mandrel 22 having one end 23 thereof secured in cantilevered fashion to a supporting structure 24.

As illustrated in FIGURE 1, a length of container body stock 25 is adapted to be continuously produced on the mandrel 22 and be rotated and axially advance to the right by a continuous crossed belt 26 having a portion 27 thereof looped around the container body stock 25 whereby movement of the belt 26 in the direction indicated by the arrows continuously rotates and axially advances the container body stock 25 to the right beyond the free end of the mandrel 22 whereby the container body stock 25 can be serially cut into the individual container bodies 20 by a conventional cutting means 28.

As the container body stock 25 is continuously rotated and axially advanced to the right on the mandrel 22, strips of container material 29, 30 and 31 are respectively drawn from free wheeling supply rolls 32, 33 and 34 onto the mandrel 22 to be helically wound thereon to continuously produce the container body stock 25.

In particular, the strip of material 29 normally comprises a lining material formed from a lamination of metallic foil and paper and is so helically wound on the mandrel 22 that the adjacent edges 35 and 36 of the strip of material 29 are disposed in overlapping relation to form a lining core 37 on the mandrel 22 with the foil side thereof engaging the mandrel 22, the overlapping edges 35 and 36 of the strip of material 29 being secured together by having a suitable adhesive 38 applied thereto by a gluing apparatus 39.

Thereafter, one or more strips of container body material 30 are helically wound onto the liner core 37 to build up the body strength of the container body stock 25, each strip 30 being secured to the underlying helically wound strip of material by having a suitable adhesive 40 applied thereto by a gluing apparatus 41 in a conventional manner.

To complete the container body stock 25, the strip of material 31 comprises a labeling or wrapping material, such as a lamination of metallic foil and paper, helically wound on top of the helically wound strip of material 30, the strip of wrapping material 31 being secured thereto by a suitable adhesive 42 applied thereto by suitable gluing apparatus 43 in a conventional manner whereby the foil side of the strip of labeling or wrapping material 31 forms the exterior surface of the container body material 25.

Therefore, it can be seen that as the container body stock 25 is continuously rotated and axially advanced on the mandrel 22 by the crossed belt 26 moving in the direction indicated by the arrows in FIGURE 1, the strips of material 29, 30 and 31 are continuously drawn onto the mandrel 22 to continuously form the container body stock 25.

The crossed belt 26 in FIGURE 1 is looped around a pair of pulleys 44 and 45 respectively having beveled gears 46 and 47 on one side thereof and respectively disposed in meshing relation with beveled gears 48 and 49 interconnected together by a common shaft 50.

Another beveled gear 51 is disposed in meshing relation with the beveled gear 47 and is driven by a suitable drive shaft 52 whereby rotation of the drive shaft 52 causes the pulleys 45 and 44 to be driven in unison so that the crossed belt 26 will continuously move in the direction indicated by the arrows in FIGURE 1 to continuously rotate and axially advance the tubular stock 25 on the mandrel 22.

However, as previously set forth, it has been found that because the outer run of the belt 26 rubs against the looped portion 27 of the belt 26 as the belt 26 continuously moves, such rubbing action causes a wearing of the belt 26 whereby the same has a relatively short life.

In addition, since the belt 26 must be twisted from the looped portion 27 thereof to pulleys 44 and 45 as well as twisted between the pulleys 44 and 45 at the run thereof which is not looped around the stock 25, the edges of the belt 26 must stretch relative to the central portions thereof whereby the belt 26 must be formed of rubber and cannot have any reinforcing means provided therein to extend the life of the belt 26.

Further, because the belt 26 must be made of stretchable material to permit the same to be twisted in the manner illustrated in FIGURE 1, such stretching of the belt 26 occurs at the loop portion 27 thereof, whereby not only is the lining material 29 of the container body stock 25 skewed relative to the other strips of material thereof, but also, such stretching of the belt 26 at the looped portion 27 thereof causes wrinkling of the labeling material 31.

This stretching of the belt 26 is fully illustrated in FIGURE 2 wherein it can be seen that as the belt 26 moves in the directions indicated by the arrows in FIGURE 2, a tension is applied on the belt 26 in the direction of the arrow indicated by the reference letter A because of the pulley 44 and builds up to a tension B caused by the pulley 45 whereby there is an increase in the length of the belt 26 as it goes around the container body stock 25 as the belt must be formed of resilient material in order to permit the above-mentioned twisting of the same.

Thus, the speed of the belt is faster at point C than at point D which produces an action that tends to skew and wrinkle the foil liner material 29 as well as the foil wrapping material 31.

However, according to the teachings of this invention, the above disadvantages of the prior known means for rotating and axially advancing the container body stock 25 on the mandrel 22 are eliminated while the life of the belt means of this invention is substantially increased and a more accurate container body stock 25 is produced.

In particular, this invention permits the belt means thereof to be longitudinally reinforced as no twisting is required of the same whereby the life of the belt means of this invention is greatly increased.

For example, reference is made to FIGURE 3 wherein an improved belt means of this invention is generally indicated by the reference numeral 53 and can comprise rubber material or the like having a plurality of endless threads or cables 54 passing longitudinally therethrough to reinforce the same, the threads 54 either being steel, nylon or the like as desired.

Such a continuous belt means 53 of this invention is utilized in a manner now to be described.

Referring now to FIGURES 4 and 5, an improved method and apparatus of this invention for continuously rotating and axially advancing tubular stock 25 on the mandrel 22 is generally indicated by the reference numeral 55 and comprises an adjustable platform 56 carrying two support means 57 and 58 respectively rotatably mounting two drive pulleys 59 and 60 having the belt means 53 looped around the same, the belt means 53 defining one run 61 thereof extending between the pulleys 59 and 60 and having a portion 62 thereof looped around the tubular stock 25 while another run 63 of the belt means 53 extends between the pulleys 59 and 60 and has a portion 64 thereof looped around a return mandrel means 65 for a purpose hereinafter described.

Thus, as the continuous belt 53 moves in the direction indicated by the arrows in FIGURE 5 upon rotation of the pulleys 59 and 60 in the direction indicated by the arrows in FIGURE 5, the belt 53 is adapted to rotate and axially advance the tubular stock 25 on the mandrel 22 without requiring twisting of the belt means 53 whereby no wrinkling of the material of the stock 25 occurs and since the belt means 53 does not rub against itself in the manner of the crossed belt 26 previously described, the life of the belt means 53 is appreciably longer than the belt means 26 previously described.

The particular details of the apparatus 55 will now be described.

As illustrated in FIGURES 6 and 7, the apparatus 55 includes a stationary frame means 66 rotatably supporting an input drive shaft 67 carrying a beveled gear 68 on the outer end thereof for a purpose hereinafter described.

The platform 56 of the apparatus 55 has a substantially central portion 69 rotatably received in a tubular portion 70 of the frame means 66 whereby the platform 56 is movable relative to the frame means 66 in any suitable manner to change the angular position of the pulleys 59 and 60 relative to the mandrel 22 which is fixed from movement relative to the frame means 66.

For example, it can be seen in FIGURE 6 that the pulleys 59 and 60 are respectively disposed parallel to each other but in spaced relation relative to each other whereby the lower side 70 of the pulley 59 in FIGURE 6 is disposed substantially in the same plane as the upper side 71 of the pulley 60 for a purpose hereinafter described.

The platform 56 is substantially L shaped and is defined by two arms 72 and 73 integrally interconnected together at the central portion 69 thereof as illustrated in FIGURES 6 and 7.

As previously set forth, the platform 56 is adapted to be moved relative to the frame means 66 about the central portion 69 thereof whereby the angular position of the pulleys 59 and 60 relative to the mandrel 22 can be varied to vary the rate of axial movement of the container body stock 25 on the mandrel as well as the angle for helically winding the strips of container material thereon.

For example, it can be seen in FIGURES 6 and 14 that the arm 73 of the platform 56 carries a pin means 74 which projects downwardly through an elongated slot 75 in the frame means 66 and is joined to a block 76 interconnected to a hand wheel 77.

Thus, by rotating the hand wheel 77 in the proper direction, the entire platform 56 can be moved relative to the frame means 66 about the central portion 69 of the platform 56 whereby the angular positions of the pulleys 59 and 60 relative to the mandrel 22 can be varied.

While one such means for moving the platform 56 relative to the frame means 66 has been described above, it is to be understood that the same can be varied as to construction and can be located in a different position on the platform 56 whereby the same does not provide a limitation on this invention.

As illustrated in FIGURE 7, a shaft 78 is rotatably carried by the central portion 69 of the platform 56 by suitable bearing means 79 and 80, the shaft 78 carrying a beveled gear 81 on the lower end thereof which is disposed in meshing relation with the beveled gear 68 carried by the drive shaft 67 whereby the rotation of the drive shaft 67 causes like rotation of the shaft 78 relative to the platform 56.

The shaft 78 carries another beveled gear 82 on the upper end thereof which is respectively disposed in meshing relation with a pair of beveled gears 83 and 84 respectively operatively interconnected to a pair of drive shafts 85 and 86 leading respectively to the support posts 57 and 58 for a purpose hereinafter described.

Because the lengths of the belt means 53 of this invention may vary, it is necessary to at least permit adjustment of one of the pulleys 59 or 60 relative to the other pulley in parallel relationship therewith in order to vary the distance between the pulleys 59 and 60 to accommodate belt means 53 of different lengths.

Accordingly, one or both of the support posts 57 and 58 can be movable toward and away from the other support posts as desired.

For example, it can be seen in FIGURES 7, 10 and 11 that the support post 57 is mounted on a plate 87 at the lower end thereof, the plate 87 being received in a slot 88 formed in the arm 72 of the platform 56.

In particular, it can be seen in FIGURE 10 that the plate 87 has outwardly directed flanges 89 overlapping the upper surface of the platform 56 and detachably carries outwardly directed bottom flange means 90 at the lower end thereof which engage the under surface of the platform 56 at the slot 88 thereof.

A block 91 is fixed to the bottom of the plate 87 and has a threaded bore 92 passing therethrough and threadedly receiving a threaded end 93 of an adjusting shaft 94 rotatably carried by the platform 56 in the manner illustrated in FIGURE 7.

A hand wheel 95 is carried on the free end of the shaft 94 whereby rotation of the hand wheel 95 in the proper direction causes axial movement of the post 57 carrying the pulley 59 toward and away from the pulley 60 in coplanar relationship therewith as controlled by the slot 88 whereby the distance between the pulleys 59 and 60 can be varied as desired.

In order to permit such adjustment of the post 57 relative to the platform 56 in the above manner, the shaft means 85 illustrated in FIGURES 7 and 11 is mounted for axial movement relative to the beveled gear 83 which is maintained in meshing relation with the beveled gear 82.

In particular, it can be seen in FIGURE 11 that the beveled gear 83 has a cylindrical portion 96 rotatably mounted in a housing 97 by bearing means 98, the housing 97 being fixed to the platform 56 in any suitable manner.

The shaft means 85 passes through the cylindrical portion 96 and gear 83 and is adapted to be slidably movable relative thereto by means of the spline arrangement illustrated whereby rotational movement of the gear 83 causes like rotation of the shaft 85 while the shaft 85 is adapted to be axially moved in the direction indicated by the arrows in FIGURE 11 relative to the beveled gear 83 to permit the axial adjustment of the post 57 relative to the platform 56 for the above purpose.

The shaft means 85 is rotatably carried by the post 57 by means of suitable bearing means 99, the shaft means 85 having a beveled gear 100 on the outer end thereof and respectively disposed in meshing relation with a beveled gear 101 carried on a shaft means 102 rotatably mounted in a vertical position in the post 57.

Similarly, the shaft means 86 for the post 58 is rotatably mounted in suitable bearing means carried by the post 58 and has a beveled gear 103 disposed in meshing relation with a beveled gear 101 fixed to a shaft means 102 rotatably carried in the vertical position in the post 58.

Since the drive from the beveled gears 100 and 103 of the shaft means 85 and 86 to the respective pulleys 59 and 60 are substantially identical, only the drive means for the pulley 60 will be described and illustrated as it is to be understood that this means is also provided in the post 57 for the pulley 59.

As illustrated in FIGURE 8, the shaft means 102 of the post 58 is rotatably mounted by bearing means 104 so that the shaft means 102 is disposed in a vertical position. The shaft means 102 carries a beveled gear 105 on the upper end thereof which is disposed in meshing relation with a beveled gear 106 splined to a horizontally disposed shaft means 107, the shaft means 107 being rotatably secured to the post 58 by bearing means 108.

The pulley 60 is splined to the shaft 107 so that upon rotation of the shaft 107, the pulley 60 rotates in unison therewith to drive the belt means 53 in a manner hereinafter described.

Thus, it can be seen that upon rotation of the input drive shaft 67 in FIGURE 7 in the proper direction, the pulleys 59 and 60 will be driven in unison therewith to drive the belt means 53 in a manner to rotate and axially advance the container body stock 25 on the mandrel 22.

Each pulley 59 and 60 has peripheral flanges 109 extending radially outwardly therefrom to define an annular cavity 110 in the pulley structure 59 or 60 to respectively receive the belt means 53 in the manner illustrated in FIGURES 8 and 9, the belt means 53 being so constructed and arranged that the same closely fits between the opposed set of flanges 109 on the respective pulleys 59 and 60 so that side weave of the belt means 53 is substantially eliminated.

A plurality of rollers 111 are provided for each pulley 59 or 60 to tend to hold the belt means 53 in the annular cavity 110 thereof as the belt means 53 travels around the respective pulley 59 or 60.

In particular, it can be seen in FIGURES 8 and 9 that each roller 111 has an outer cylindrical sleeve of resilient material 112 and is rotatably mounted to a shaft means 113 by suitable bearing means 114 whereby the respective roller 111 is adapted to rotate relative to the shaft means 113.

Each shaft means 113 is interconnected to an adjusting shaft 115 at the outer ends thereof, each shaft 115 being slidably movable relative to frame means 116 carried by the respective support post 57 or 58 whereby adjustment of a hand wheel or knob 117 for each adjusting shaft means 115 moves the respective roller 111 toward and away from the respective pulley 59 or 60.

Thus, the rollers 111 for each pulley 59 and 60 can be so adjusted that the same merely hold the respective portion of the belt means 53 between the flanges 109 of the pulley 59 or 60 or the rollers 111 can be utilized to compress the belt means 53 against the central portion of the pulleys 59 or 60.

For example, if the belt means 53 being utilized in the apparatus 55 is smooth on both opposed surfaces thereof, the rollers 111 can be inwardly adjusted to frictionally compress the smooth belt means 53 against the respective pulley 59 or 60 to provide a frictional drive therebetween whereby rotation of the pulleys 59 and 60 in the manner previously described will drive the belt means 53 with a minimum of slippage between the belt means 53 and the pulleys 59 and 60.

Alternately, if the belt 53 of this invention is a timing belt, i.e., has a plurality of transversely disposed teeth on one side thereof and the pulleys 59 and 60 respectively have teeth between the flanges 109 thereof which mesh with the teeth of the belt 53 in the manner illustrated in FIGURES 4, 8 and 9, the rollers 111 need only be inwardly adjusted a distance sufficient to hold the belt means 53 in meshing relation with the teeth of the pulleys 59 and 60 without compressing the same against the pulleys 59 and 60. In this manner, a positive drive is provided between the pulleys 59 and 60 and the belt means 53 and the rollers 111 need be utilized only to maintain the teeth of the belt means 53 in meshing relation with the teeth of the pulleys 59 and 60.

For example, it can be seen in FIGURE 9 that the belt means 53 has a plurality of transversely disposed straight teeth 118 formed on one side thereof while each of the pulleys 59 and 60 has a plurality of straight teeth 119 between the flanges 109 thereof which respectively mesh with the teeth 118 on the blet means 53 to provide a positive drive therewith.

In order to prevent the belt means 53 of the apparatus 55 of this invention from having the opposed portions of the lower run 61 thereof rubbing against each other at the looped portion 62 thereof, a gap 120, FIGURE 4, is provided between the opposed portions 121 and 122 of the lower run 61 of the belt means 53 which is determined by the coplanar relationship of the pulleys 59 and 60.

In this manner, the belt means 53 has a width slightly smaller than the width of the strips of container body material being drawn on the mandrel 22 in the manner previously described.

For example, it can be seen in FIGURES 4 and 5 that the strips of material 30 and 31 (the strip of material 29 not being illustrated in FIGURES 4 and 5) have a width greater than the belt means 53 whereby the gap 120 can be provided in the run 61 of the belt means 53 to prevent the portions 121 and 122 from rubbing against each other.

Further, it can be seen in FIGURE 5, that the pulleys 60 and 59 are so constructed and arranged relative to the mandrel 22 that the portions 121 and 122 are disposed in the same horizontal plane and are respectively disposed tangentially to the upper surface of the container body stock 25.

In this manner, there is no twisting of the belt means 53 as the same is being fed from the pulley 59 and being drawn onto the pulley 60 whereby there is no skewing of the container body material forming the container body stock 25 as provided by the prior known crossed belt 26.

Thus, the belt means 53 of this invention is readily adapted to be utilized after the labeling material 31 is formed on the mandrel 22 to not only radially inwardly compress all of the container body material to form a more uniform container body stock 25, but also to accurately rotate and axially advance the same so that the strips of material 29–31 are properly drawn onto the mandrel 22 to provide uniform body stock 25.

Further, since the upper run of the belt means 53 is not twisted between the pulleys 59 and 60 because of the return mandrel means 65 in a manner hereinafter described, the belt means 53 is adapted to have the aforementioned longitudinal reinforcing threads or cables 54 provided therein whereby the life of the belt means 53 is substantially increased over the crossed belt 26 so that the belt means 53 does not have to be changed as often as the belt means 26 for the reasons previously set forth.

The return mandrel means 65 of the apparatus 55 comprises a cylindrical structure as illustrated in FIGURES 4 and 12 having one end 123 thereof mounted in cantilevered fashion to a supporting structure 124 carried by the frame means 66 or any other suitable stationary structure.

The mandrel means 65 is adapted to be vertically adjusted relative to the support means 124 as the support means 124 has a vertically disposed slot means 125 therein and receiving the end 123 of the mandrel means 65, the mandrel means 65 being secured to a collar 126 fixed to a plate 127 vertically adjustable relative to the frame means 124.

For example, the plate 124 has a plurality of vertically disposed slots 128 formed therein and adapted to receive fastening members 129 in the manner illustrated in FIGURE 13 whereby upon loosening of the fastening means 129, the mandrel means 65 can be moved vertically upwardly and downwardly relative to the mandrel 22 to take up the slack in the belt means 53 as the length of different belt means 53 might vary.

The mandrel means 65 is disposed parallel with the mandrel means 22 and vertically above the same for a purpose now to be described.

The upper run 63 of the belt means 53 as illustrated in FIGURE 4 has a portion 64 thereof looped around the mandrel means 65 whereby the upper run 63 of the belt means 53 is divided into two portions 130 and 131. The portion 130 of the upper run 63 of the belt means 53 comes directly off the drive pulley 60 onto the mandrel means 65 in the same plane as the lower portion 122 of the run 61 of the belt means 53.

Similarly, the portion 131 of the upper run 63 of the belt means 53 comes off the mandrel means 65 onto the pulley 59 in the same plane as the lower portion 121 of the belt means 53 whereby it can be seen that the mandrel means 65 properly takes the belt means 53 off the pulley 60 and properly feeds the same onto the pulley 59 so that no twisting of the belt means 53 is required even though the pulley means 59 and 60 are offset relative to each other.

In order to compensate for the gap 120 in the belt means 53 as well as to provide a guiding means for the looped portion 64 around the mandrel means 65, a flange means 132, FIGURES 4 and 12, is helically wound around the mandrel means 65 to properly guide the portion 64 of the belt means 53 around the mandrel means 65 to provide the aforementioned relationship of the run 63 relative to the pulleys 59 and 60.

Since the tension on the belt means 53 is provided at the run 61 thereof, the run 63 of the belt means 53 is substantially slack whereby very little friction is encountered between the looped portion 64 of the belt means 53 and the mandrel means 65.

However, in order to eliminate as much wear as possible between the belt means 53 and the mandrel means 65, the mandrel means 65 can be made of nylon or the like, or the same can be Teflon coated to tend to reduce the friction between the mandrel means 65 and the belt means 63.

Alternately, or additionally, the mandrel means 65 could be air greased or fluid greased to further decrease the friction between the belt means 63 and the mandrel means 65.

Therefore, it can be seen that since no slippage occurs between the belt means 53 and the pulleys 59 and 60, the looped portion 62 of the lower run 61 of the belt means 63 rotates relative to the mandrel 22 in unison with the rotation of the container body stock 25 whereby there is no friction encountered at the looped portion 62 of the belt means 53. Therefore, it can be seen that only minute friction occurs between the looped portion 64 of the belt means 53 and the mandrel means 65 whereby very little wear is encountered by the belt 53 while the prior art belt 26 has considerable wear because the two runs thereof rub together.

Thus, the life of the belt means 53 of this invention is substantially longer than the life of the belt means 26 previously described.

In addition, the belt means 53 of this invention has longitudinal reinforcing threads 54 not possible in the belt means 26 whereby the life of the belt means 53 of this invention is further increased over the belt means 26 previously described.

However, it is to be understood that all friction between the belt means 53 and the mandrel means 65 could be eliminated if the mandrel means 65 carried a plurality of roller means or the like.

For example, reference is made to FIGURES 15–17 wherein another return mandrel means of this invention is generally indicated by the reference numeral 133.

As illustrated in FIGURES 15 and 16, the mandrel means 133 includes an end 134 adapted to be adjustably mounted to the frame means 124 in the manner previously described.

However, the forward portion 135 of the mandrel means 133 is provided with a plurality of flat surfaces 136 for a purpose hereinafter described.

For example, the embodiment of the mandrel means 133 illustrated in the drawings, has eight such flat surfaces 136 to provide mounting means for a plurality of rollers 137.

Each roller 137 is rotatably mounted in a frame means 138 fixed to a respective flat surface 136 of the mandrel means 133 by a fastening member 139, each fastening member 139 being respectively received in a suitable threaded aperture 140 formed in the respective flat surface 136.

Thus, it can be seen in FIGURE 16, that the apertures 140 can be so arranged on the flat surfaces 136 of the mandrel means 133 to provide a desired pattern whereby the looped portion 64 of the belt means 53 can be readily looped around the same to run against the rollers 137 whereby no friction is created between the looped portion 64 of the belt means 53 and the mandrel means 133.

In order to guide the looped portion 64 of the belt means 53 relative to the mandrel means 133 and to compensate for the gap 120 in the lower run 61 of the belt means 53, a plurality of guide pins 141 can project outwardly from the flat surfaces 136 of the mandrel means 133 in the manner illustrated in FIGURES 15 and 17 to guide the looped portion 64 in the same manner as provided by the helically wound flange means 132 of the mandrel means 65 previously described.

For example, the pin means 141 can each be respectively received in a suitable aperture 142 formed in the flat surface 136 of the mandrel means 133 in the manner illustrated in FIGURE 17.

Therefore, it can be seen that the mandrel means 133 of this invention provides a frictionless return means for the upper run 63 of the belt means 53 so that the belt means 53 will not encounter any friction during its operation in the manner previously described.

The operation of the apparatus 55 will now be described.

After the belt 53 has been disposed around the pulleys 59 and 60 and has the portion 62 of the run 61 thereof looped around the container body stock 25 and the portion 64 of the run 63 thereof looped around the return mandrel means 65 or 133, the angular position of the platform 56 is adjusted relative to the mandrel 22 in the manner previously described to provide the proper angle of the pulleys 59 and 60 relative to the mandrel 22. Also, the post 57 is moved toward and away from the post 58 in the manner previously described to adjust for the proper length of the belt means 53.

Thereafter, the rollers 111 are adjusted to the proper position relative to the pulleys 59 and 60. For example, should the belt 53 be smooth on both sides thereof, the rollers 111 are moved radially inwardly toward the pulleys 59 and 60 the desired distance to compress the belt means 53 against the pulleys 59 and 60 to provide a frictional drive between the pulleys 59 and 60 and the belt means 53. Alternately, if the belt means 53 has teeth on the driving side thereof, the rollers 111 are merely moved inwardly a sufficient distance to cause the teeth of the belt means 53 to mesh with the pulleys 59 and 60 in the manner previously described.

Subsequently, the mandrel means 65 or 133 is vertically adjusted relative to the mandrel 22 to take up any adverse slack in the run 63 thereof.

After the belt 53 has been adjusted in the above manner, the pulleys 59 and 60 are driven in the manner previously described by the drive shaft 67 whereby the belt means 53 moves in the direction indicated by the arrows in FIGURE 5 to continuously rotate and axially advance the container body stock 25 on the mandrel 22 so that the container body stock 25 will be continuously produced.

Because a gap 120 is formed at the looped portion 62 of the lower run 61 of the belt 53, it can be seen that no rubbing exists between portions 121 and 122 of the run 61 of the belt means 53 whereby no wearing takes place.

Further, since the belt 53 is fed on and off the pulleys 59 and 60 in a coplanar relationship therewith, it can be seen that no twisting of the belt means 53 takes place whereby the belt means 53 can be provided with the reinforcing threads 54 previously described and the container body stock 25 will not have any of the material thereof skewed because of stretching of the belt means 53.

Accordingly, it can be seen that an improved method and apparatus has been provided by this invention for rotating and axially advancing tubular stock or the like whereby the various disadvantages of the prior known crossed belt 26 are eliminated and additional advantages are provided by this invention as set forth above.

While one embodiment of this invention has been previously set forth, it is to be understood that various changes can be made therein within the teachings of this invention and that the same will be covered by the appended claims.

For example, another embodiment of the apparatus and method of this invention is generally indicated by the reference numeral 143 in FIGURE 18 and parts thereof similar to the apparatus 55 illustrated in FIGURE 5 will be indicated by like reference numerals followed by the reference letter A.

As illustrated in FIGURE 18, the pulley 60A is driven by suitable drive means 144 in substantially the same manner previously described for the apparatus 55. However, the pulley 59A of the apparatus 143 is an idling pulley and is not driven except by the frictional engagement of the belt means 53A being moved around the same.

The pulley 59A is fixed to a rotatably mounted shaft means 145 which has suitable brake means 146 applied thereto to tend to retard rotation of the pulley means 59A so that tension is built up in the portion 121A of the belt means 53A extending between the pulley 59A and the mandrel 22A.

For example, the brake means 146 could comprise a pair of brake shoes 147 respectively being urged into engagement with the shaft 145 of the pulley 59A by compression spring means 148 carried by a suitable stationary frame means 149.

In this manner, a constant tension is maintained on the looped portion 62A of the belt means 53A about the can making mandrel 22A.

Thus, it can been seen that if the toothed timing belt 53 of the apparatus 55 had any variation in the pitch length of the teeth thereof, tooth spacing on the belt would make the line of the belt between the pulleys 59 and 60 be either shorter or longer and would cause a variation in the belt tension around the mandrel 22.

However, with the braking means 146 of the apparatus illustrated in FIGURE 18, the brake means 146 will give constant tension in the belt 53A at the mandrel 22A at all times.

Further, while straight transversely disposed teeth 118 and 119 have been provided for the belt means 53 and pulley means 59 and 60 previously described, it is to be understood that the configuration of the teeth of the belt 53 and pulleys 59 and 60 can be varied as desired.

For example, reference is made to FIGURE 19 wherein another belt means 53B of this invention is illustrated and has a plurality of V-shaped chevron type teeth 150 on the driving side thereof which will mesh with correspondingly shaped teeth formed on the means 59 and 60.

It has been found that this chevron type of drive belt 53B will transmit heavy loads at high speed where a continuous service is required, where shock and vibration are present or where a high reduction ratio is necessary. Further, this type of belt 53B has greater active face width than present day timing belts and therefore is a stronger belt. In addition, the chevron type of belt 53B produces no thrust as the opposing helices counterbalance one another and therefore eliminate the necessity of having flange side members 109 on the pulleys 59 and 60.

It is believed that the success of the chevron type belt 53B of this invention is due to the greater number of teeth in contact with the pulleys 59 and 60 and the continuity of tooth action which is an outgrowth of the helix angle of the container forming apparatus.

Therefore, it can be seen that this invention not only provides improved methods and apparatus for continuously rotating and axially advancing container body stock, but this invention also provides improved belt means for such apparatus and methods.

While the form of the invention now preferred has been disclosed as required by the statutes, other forms may be used, all coming within the scope of the claims which follow.

What is claimed is:

1. Apparatus for rotating and axially advancing tubular stock or the like comprising a pair of pulleys respectively disposed on opposite sides of said stock, a continuous belt looped around said pulleys whereby one run of said belt extends from one side of one of said pulleys to a like side of the other pulley and another run of said belt extends from the other side of said one pulley to a like side of said other pulley, one of said runs of said belt having a portion thereof looped around said tubular stock to rotate and axially advance the same as said belt moves in one direction, and means for looping the other run of said belt through an arc of 360° between said pulleys.

2. Apparatus as set forth in claim 1 wherein said two runs of said belt do not touch each other as said belt moves in said one direction.

3. Apparatus as set forth in claim 1 wherein said looped portion of said belt has a space between the length thereof that extends from said one pulley to said stock and the length thereof that extends from said other pulley to said stock.

4. Apparatus as set forth in claim 1 wherein means are provided to adjust one of said pulleys toward and away from the other pulley to loosen or tighten said belt.

5. Apparatus as set forth in claim 1 wherein means are provided to adjust the angular position of said pulleys relative to said stock.

6. Apparatus for rotating and axially advancing tubular stock or the like comprising a pair of pulleys respectively disposed on opposite sides of said stock, a continuous belt looped around said pulleys whereby one run of said belt extends from one side of one of said pulleys to a like side of the other pulley and another run of said belt extends from the other side of said one pulley to a like side of said other pulley, one of said runs of said belt having a portion thereof looped around said tubular stock to rotate and axially advance the same as said belt moves in one direction, said belt having transversely disposed teeth on one side thereof, said pulleys having teeth that mesh with said teeth of said belt to provide positive drive between said pulleys and said belt, and means for looping the other run of said belt through an arc of 360° between said pulleys.

7. Apparatus as set forth in claim 6 and including means to hold said belt in meshing relation with said pulleys.

8. Apparatus for rotating and axially advancing tubular stock or the like comprising a pair of pulleys respectively disposed on opposite sides of said stock, a continuous belt looped around said pulleys whereby one run of said belt extends from one side of one of said pulleys to a like side of the other pulley and another run of said belt extends from the other side of said one pulley to a like side of said other pulley, one of said runs of said belt having a portion thereof looped around said tubular stock to rotate and axially advance the same as said belt moves in one direction, means for looping the other run of said belt through an arc of 360° between said pulleys, and roller means cooperating with said pulleys to hold said belt on said pulleys as said belt is moved.

9. Apparatus as set forth in claim 8 wherein each pulley means has opposed periphery flanges to guide said belt and said roller means hold said belt between said flanges.

10. Apparatus as set forth in claim 8 wherein said roller means are adjustable toward and away from said pulleys.

11. Apparatus as set forth in claim 8 wherein said roller means compress said belt against said pulleys to increase the friction therebetween.

12. Apparatus for rotating and axially advancing tubular stock or the like comprising a pair of pulleys respectively disposed on opposite sides of said stock, a continuous belt looped around said pulleys whereby one run of said belt extends from one side of one of said pulleys to a like side of the other pulley and another run of said belt extends from the other side of said one pulley to a like side of said other pulley, one of said runs of said belt having a portion thereof looped around said tubular stock to rotate and axially advance the same as said belt moves in one direction, means to rotate said one pulley whereby said one run is drawn onto said one pulley, and means to brake said other pulley whereby tension is applied on said one run to cause said looped portion to compress said stock.

13. Apparatus as set forth in claim 12 wherein said brake means causes slack in said other run of said belt.

14. Apparatus for rotating and axially advancing tubular stock or the like comprising a pair of pulleys respectively disposed on opposite sides of said stock and in planes angularly disposed relative to said stock with said planes being spaced from each other and parallel to each other, a continuous belt looped around said pulleys and having a portion thereof looped around said tubular stock whereby said belt rotates and axially advances said tubular stock as said belt moves in one direction, and means for looping the other run of said belt through an arc of 360° between said pulleys.

15. Apparatus for rotating and axially advancing tubular stock on a mandrel or the like comprising a pair of pulleys respectively disposed on opposite sides of said mandrel and in planes angularly disposed relative to said mandrel with said planes being spaced from each other and parallel to each other, a continuous belt looped around said pulleys and having a portion thereof looped around said tubular stock whereby a length of said belt extends from one pulley to said mandrel and another length of said belt extends from said mandrel to the other pulley with said lengths being respectively disposed in said planes, means for looping the other run of said belt through an arc of 360° between said pulleys, and means for continuously moving said belt to rotate and axially advance said tubular stock on said mandrel.

16. Apparatus as set forth in claim 15 wherein said last-named means includes for driving at least one of said pulleys.

17. Apparatus for rotating and axially advancing tubular stock or the like comprising a pair of pulleys respectively disposed on opposite sides of said stock and in planes angularly disposed relative to said stock with said planes being spaced from each other and parallel to each other, a continuous belt looped around said pulleys to provide two runs of said belt extending between said pulleys, one run of said belt having a portion thereof looped around said tubular stock whereby said belt rotates and axially advances said tubular stock as said belt moves in one direction, and means taking the feed of the other run from one of said pulleys and looping the same through an arc of 360° to feed the same onto the other pulley in the plane thereof.

18. Apparatus for rotating and axially advancing tubular stock or the like comprising a pair of pulleys respectively disposed on opposite sides of said stock, a continuous belt looped around said pulleys whereby one run of said belt extends from one side of one of said pulleys to a like side of the other pulley and another run of said belt extends from the other side of said one pulley to a like side of said other pulley, one of said runs of said belt having a portion thereof looped around said stock to rotate and axially advance the same as said belt moves in one direction, and means for looping the other run of said belt through an arc of 360° between said pulleys and directing the other run of said belt to properly feed onto the receiving pulley.

19. Apparatus for rotating and axially advancing tubular stock on a mandrel or the like comprising a pair of pulleys respectively disposed on opposite sides of said mandrel and in planes angularly disposed relative to said mandrel with said planes being spaced from each other and parallel to each other, a continuous belt looped around said pulleys to provide two runs of said belt extending between said pulleys, one run of said belt having a portion thereof looped around said tubular stock whereby a length of said one run extends from one pulley to said mandrel and another length of said one run extends from said mandrel to the other pulley with said lengths of said one run being respectively disposed in said planes, and a second mandrel means having a portion of the other run of said belt looped around the same whereby a length of said other run extends from one pulley to said second mandrel means and another length of said other run extends from said second mandrel means to the other pulley with said lengths of said other run being respectively disposed in said planes.

20. Apparatus as set forth in claim 19 wherein said second mandrel means is disposed parallel with said first-named mandrel.

21. Apparatus as set forth in claim 19 wherein said second mandrel means carries roller means to eliminate friction between said second mandrel means and said looped portion of said other run of said belt.

22. Apparatus as set forth in claim 19 wherein said second mandrel means has guide means for controlling the movement of said belt thereover.

23. Apparatus as set forth in claim 22 wherein said guide means includes a flange means helically wound around said second mandrel means.

24. Apparatus as set forth in claim 22 wherein said guide means includes a plurality of pins radially carried by said second mandrel means.

25. Apparatus as set forth in claim 19 wherein said second mandrel is adjustable toward and away from said first-named mandrel.

26. A mandrel means for receiving a looped portion of a traveling belt or the like, said mandrel means having means to guide said belt as said belt passes around said mandrel means, said guide means including a plurality of pins radially carried by said mandrel means.

27. A mandrel means as set forth in claim 26 and including a plurality of rollers carried by said mandrel means to eliminate friction between said mandrel means and said looped portion of said belt.

28. A method for rotating and axially advancing tubular stock or the like comprising the steps of looping a continuous belt around a pair of pulleys disposed on opposite sides of said stock to cause one run of said belt to extend from one side of one of said pulleys to a like side of the other pulley and another run of said belt to extend from the other side of said pulley to a like side of said other pulley, looping a portion of one run of said belt around said stock, looping the other run of said belt through an arc of 360° between said pulleys, and moving said belt in one direction to rotate and axially advance said stock.

29. A method as set forth in claim 28 and including the step of forming a space between the length of said one run of said belt that extends from said one pulley to said stock and the length thereof that extends from said other pulley to said stock.

30. A method as set forth in claim 28 and including the step of adjusting one of said pulleys toward or away from the other pulley.

31. A method as set forth in claim 28 and including the step of adjusting the angular position of said pulleys relative to said stock.

32. A method for rotating and axially advancing tubular stock or the like comprising the steps of disposing a pair of pulleys on opposite sides of said stock and in planes angularly disposed relative to said stock with said planes being spaced from each other and parallel to each other, looping a continuous belt around said pulleys, looping a portion of said belt around said stock whereby movement of said belt rotates and axially advances said stock, and looping the other run of said belt through an arc of 360° between said pulleys.

33. A method for rotating and axially advancing tubular stock or the like comprising the steps of looping a continuous belt around a pair of pulleys disposed on opposite sides of said stock to cause one run of said belt to extend from one side of one of said pulleys to a like side of the other pulley and another run of said belt to extend from the other side of said pulley to a like side of said other pulley, looping a portion of one run of said belt around said stock, driving one of said pulleys whereby said one run of said belt is drawn onto said pulley to cause said stock to rotate and axially advance, and braking the rotational movement of said other pulley to apply tension on said one run and cause said looped portion to compress said stock.

34. A method for rotating and axially advancing tubular stock on a mandrel or the like comprising the steps of providing a pair of pulleys on opposite sides of said mandrel and in planes angularly disposed relative to said stock with said planes being spaced from each other and parallel to each other, looping a continuous belt around said pulleys, looping a portion of said belt around said stock so that one length of said belt extends from one pulley to said mandrel and another length of said belt extends from said mandrel to the other pulley with said lengths being respectively disposed in said planes whereby movement of said belt in one direction rotates and axially advances said stock on said mandrel and looping the other run of said belt through an arc of 360° between said pulleys.

35. A method as set forth in claim 34 and including the step of driving at least one of said pulleys to move said belt in one direction.

36. A method for rotating and axially advancing tubular stock or the like comprising the steps of providing a pair of pulleys on opposite sides of said stock and in planes angularly disposed relative to said stock with said planes being spaced from each other and parallel to each other, looping a continuous belt around said pulleys to provide two runs of said belt extending between said pulleys, looping a portion of one run of said belt around said tubular stock whereby said belt rotates and axially advances said tubular stock as said belt moves in one direction, and looping the other run of said belt through an arc of 360° between said pulleys and feeding the same onto the other pulley in the plane thereof.

37. A method for rotating and axially advancing tubular stock on a mandrel or the like comprising the steps of providing a pair of pulleys on opposite sides of said mandrel and in planes angularly disposed relative to said mandrel with said planes being spaced from each other and parallel to each other, looping a continuous belt around said pulleys to provide two runs of said belt extending between said pulleys, one run of said belt having a portion thereof looped around said tubular stock whereby a length of said one run extends from one pulley to said mandrel and another length of said one run extends from said mandrel to the other pulley with said lengths of said one run being respectively disposed in said planes so that movement of said belt in one direction rotates and axially advances the stock on said mandrel, and looping a portion of the other run of said belt around a second mandrel means so that a length of said other run extends from one pulley to said second mandrel means and another length of said other run extends from said second mandrel means to the other pulley with said lengths of said other run being respectively disposed in said planes.

38. A method as set forth in claim 37 and including the step of disposing said second mandrel means parallel with said first-named mandrel.

39. A method as set forth in claim 37 and including the step of providing a plurality of roller means on said second mandrel means to eliminate friction between said second mandrel means and said looped portion of said other run of said belt.

40. A method as set forth in claim 37 and including the step of providing guide means on said second mandrel means for controlling the movement of said belt thereover.

41. A method as set forth in claim 40 wherein said last-named step includes the step of providing helically wound flange means around said second mandrel means.

42. A method as set forth in claim 40 wherein said last-named step includes the step of radially disposing a plurality of pins around said second mandrel means.

43. A method for making a mandrel means for receiving a looped portion of a traveling belt or the like comprising the steps of providing a mandrel means, and providing guide means on said mandrel means to guide said belt as said belt passes along said mandrel means, said last-named step including the step of radially disposing a plurality of pins around said mandrel means.

44. A method as set forth in claim 43 and including the step of disposing a plurality of rollers around said mandrel means to eliminate friction between said mandrel means and said looped portion of said belt.

References Cited
UNITED STATES PATENTS

| | | | |
|---|---|---|---|
| 941,255 | 11/1909 | Jenkins | 93—80 |
| 1,006,976 | 10/1911 | Osborn | 93—80 |
| 1,031,965 | 7/1912 | Schoettle | 93—80 |
| 2,937,538 | 5/1960 | Worrall | 74—231 X |
| 3,004,585 | 10/1961 | Lewis et al. | 93—80 X |

BERNARD STICKNEY, *Primary Examiner.*

FRANK E. BAILEY, *Examiner.*